US012679766B2

(12) United States Patent

Guillemot et al.

(10) Patent No.: US 12,679,766 B2

(45) Date of Patent: Jul. 14, 2026

(54) METHOD FOR PRODUCING A SAFETY TEMPERED VEHICLE GLAZING UNIT AND SAFETY TEMPERED VEHICLE GLAZING UNIT

(71) Applicant: SAINT-GOBAIN GLASS FRANCE, Courbevoie (FR)

(72) Inventors: Laure-Hélène Guillemot, Compiègne (FR); Svenja Bourone, Aachen (DE)

(73) Assignee: SAINT GOBAIN SEKURIT FRANCE, Thourotte (FR)

( * ) Notice: Subject to any disclaimer, the term of this patent is extended or adjusted under 35 U.S.C. 154(b) by 825 days.

(21) Appl. No.: 17/915,899

(22) PCT Filed: Mar. 1, 2021

(86) PCT No.: PCT/EP2021/054992

§ 371 (c)(1),
(2) Date: Sep. 29, 2022

(87) PCT Pub. No.: WO2021/197731

PCT Pub. Date: Oct. 7, 2021

(65) Prior Publication Data

US 2023/0145959 A1 May 11, 2023

(30) Foreign Application Priority Data

Mar. 31, 2020 (EP) .................................... 20166945

(51) Int. Cl.
*C03C 17/32* (2006.01)
*B60J 1/08* (2006.01)
(Continued)

(52) U.S. Cl.
CPC .............. *C03C 17/322* (2013.01); *B60J 1/08* (2013.01); *B60J 1/18* (2013.01); *C03C 17/38* (2013.01);
(Continued)

(58) Field of Classification Search
CPC ....... C03C 17/28; C03C 17/32; C03C 17/322; C03C 17/34; C03C 17/38; C03C 17/42;
(Continued)

(56) References Cited

U.S. PATENT DOCUMENTS 3,808,077 A * 4/1974 Rieser ............... B32B 17/10889
156/289
4,160,853 A * 7/1979 Ammons ............... C09J 175/06
528/371

(Continued)

FOREIGN PATENT DOCUMENTS

CN 102241474 A * 11/2011
CN 202986762 U 6/2013
(Continued)

OTHER PUBLICATIONS

Machine translation of WO03014034A1, published Feb. 2003, Powered by EPO and Google. (Year: 2003).*
(Continued)

*Primary Examiner* — Monique R Jackson
(74) *Attorney, Agent, or Firm* — CUSHMAN PARTNERS LLC

(57) ABSTRACT

A method for producing a safety tempered vehicle glazing unit, includes a. tempering a glass pane at a tempering temperature; b. cooling the tempered glass pane to a first temperature T1 above room temperature; c. coating the tempered glass pane with a dispersion of an organic resin at the first temperature T1, and d. drying and cooling to room temperature Tr.

14 Claims, 2 Drawing Sheets

Figure 1:
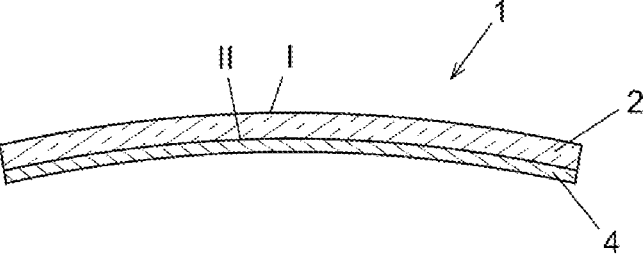

(51) Int. Cl.
| | |
|---|---|
| *B60J 1/18* | (2006.01) |
| *C03C 17/38* | (2006.01) |
| *C03C 23/00* | (2006.01) |
| *C03B 27/00* | (2006.01) |

(52) U.S. Cl.
CPC ............ *C03C 23/007* (2013.01); *C03B 27/00* (2013.01); *C03C 2218/112* (2013.01); *C03C 2218/114* (2013.01)

(58) Field of Classification Search
CPC ............ C03C 17/3681; C03C 17/3657; C03C 17/366; B32B 17/10018
See application file for complete search history.

(56) References Cited

U.S. PATENT DOCUMENTS

| | | | | |
|---|---|---|---|---|
| 4,944,822 | A * | 7/1990 | Ishikawa ........... | B32B 17/10018 |
| | | | | 156/286 |
| 4,995,895 | A * | 2/1991 | Groth .................. | C03C 17/3681 |
| | | | | 65/60.5 |
| 5,115,346 | A | 5/1992 | Lynam | |
| 8,835,592 | B2 * | 9/2014 | Rukavina .............. | C08G 18/28 |
| | | | | 528/65 |
| 2009/0044897 | A1 * | 2/2009 | Thomsen ................ | C03C 17/42 |
| | | | | 156/150 |
| 2011/0045219 | A1 * | 2/2011 | Stewart ................ | C09D 175/04 |
| | | | | 428/34.7 |
| 2013/0225760 | A1 * | 8/2013 | Jing ........................ | H10F 71/00 |
| | | | | 438/64 |
| 2016/0129945 | A1 | 5/2016 | Deppe | |

FOREIGN PATENT DOCUMENTS

| | | | | |
|---|---|---|---|---|
| DE | 10 2006 028328 A1 | 1/2008 | | |
| EP | 1 436 156 A2 | 7/2004 | | |
| EP | 2 995 451 A1 | 3/2016 | | |
| GB | 839677 A | 6/1960 | | |
| WO | WO-03014034 A1 * | 2/2003 | ............ | C03B 27/03 |
| WO | WO 03/041980 A2 | 5/2003 | | |
| WO | WO 2005/115939 A1 | 12/2005 | | |
| WO | WO 2013/026612 A1 | 2/2013 | | |
| WO | WO 2015/082814 A1 | 6/2015 | | |

OTHER PUBLICATIONS

AGC Solar, SOLITE (RTM) Product Information Sheet, Dec. 2019, retrieved from the Wayback Machine at <https://web.archive.org/web/20191222004550/https://www.greenrhinoenergy.com/solar/downloads/AGC_Solite-LR.pdf>. (Year: 2019).*

Bravet, Bilayer Glazing: A Concept with Improved Solutions for Tomorrow's Automobiles, 1995, SAE International, SAE Transactions, vol. 104, Section 6: Journal of Passenger Cars: Part 1, pp. 163-172. (Year: 1995).*

Machine translation of CN102241474A, published Nov. 2011, Powered by EPO and Google. (Year: 2011).*

International Search Report as issued in International Patent Application No. PCT/EP2021/054992, dated Apr. 12, 2021.

* cited by examiner

METHOD FOR PRODUCING A SAFETY TEMPERED VEHICLE GLAZING UNIT AND SAFETY TEMPERED VEHICLE GLAZING UNIT

CROSS-REFERENCE TO RELATED APPLICATIONS

This application is the U.S. National Stage of PCT/EP2021/054992, filed Mar. 1, 2021, which in turn claims priority to European patent application number 20 166 945.4 filed Mar. 31, 2020. The content of these applications are incorporated herein by reference in their entireties.

The invention concerns a method for producing a safety tempered vehicle glazing unit and a safety tempered vehicle glazing unit.

Glazing units for vehicles, for example glass roofs, are typically made by laminated glass in order to prevent pieces of glass spilling around in case of breakage of the glazing unit. However, laminated glass comprises at least two glass panes. Thus, a glazing unit made from laminated glass is heavy and expensive due to high production costs for the laminated glass.

Conventionally tempered glass does not have any shatter protection. Thus, a breakage of the conventional tempered glass spills pieces of glass around, which might lead to dangerous situations.

CN20298676 and EP 14136156 A2 disclose a glass cover for use as a car roof, wherein a glass pane is laminated or engaged with a laminated film. The laminated film comprises an adhesive film, e.g. a polyvinyl acetate film or polyurethane film, and an anti-cracking film made from PET. The glass cover further comprises a frame with a peripheral embedding foam.

US 2016/0129945 A1 discloses an arrangement for closing an opening in a vehicle roof with a pane and a light-guiding sheet. The pane may be provided on one side with an adhesive film assembly comprising an anti-shatter protective film on the far side of the pane. The application of an adhesive film is costly and risks to decrease the optical properties of the pane unit.

EP 2 995 451 A1 discloses a glass cover for use in a vehicle roof. The glass cover comprises a glass pane and an anti-shatter layer arranged on the underside of the glass pane. The anti-shatter layer might comprise an anti-shatter scratch resistant foil, possibly of polyethylene terephthalate (PET) or polycarbonate (PC) and an adhesive anti-shatter foil, possible made from polyurethane (PU) or polyvinyl butyral (PVB). The layers might be laminated to the glass.

U.S. Pat. No. 5,115,346 A discloses an anti-scatter, ultraviolet protected, anti-misting electro-optical rearview mirror. The mirror is provided with an adhesive layer as anti-scattering layer on the front side of the mirror. The anti-shattering layer may be a sheet of polymer material such as reticulated polyurethane.

DE 10 2006 028 328 A1 discloses to coat a glass pane or mirror pane with a polyurethane layer by spraying a polyurethane resin onto the pane.

WO 2005/115939 A1 discloses a paint composition for brittle objects such as glasses and mirrors. The paint comprises an anionic aqueous solution of a polyurethanic compound including at least one aliphatic or aromatic polyurethanic compound. In particular it may comprise an anionic aqueous solution of a polyurethanic compound preferably although not exclusively including:

4-4' dicyclohexylmethane-diisocyanate (H12MD1);

at least one compound selected from the group comprising polyethylene glycol, polypropylene glycol, polytetrahydrofuran glycol; and dimethylpropionic acid.

WO 2013/026612 A1 discloses a window pane with a hydrophilic coating. The coating contains at least polyurethane, polyvinylpyrrolidone and a flow agent. Polyvinylpyrrolidone is a hygroscopic polymer that can absorb up to 40% of its own mass in water and thus important for the hydrophilic properties. The substrate comprises, preferably, glass, particularly preferably, sheet glass, float glass, quartz glass, borosilicate glass, soda lime glass. The substrate may be a thermally prestressed single pane safety glass made of soda lime glass. In an alternative preferred embodiment, the substrate comprises polymers, particularly preferably polyethylene, polypropylene, polycarbonate, polymethyl methacrylate, and/or mixtures thereof. The hydrophilic layer is bonded to the substrate via an adhesion promoter. The adhesion promoter is applied before the solution containing the precursors for the formation of the hydrophilic PU layer. The document discloses a method to apply an organic solution of the precursors to a substrate and dry the applied solution to remove the solvent. The temperature of the window pane is raised after drying to make the isocyanate compound react with the polyol. Thus, a precursor is deposited and afterwards the reaction takes place to form the hydrophilic PU layer.

WO 2015/082814 A1 discloses a fabrication method for a hydrophilic layer on a glazing having a glass substrate. A solution is deposited onto the glass substrate and afterwards reacted to the hydrophilic layer. The solution contains an isocyanate, a polyol and polyvinylpyrrolidone, a film making agent and an organic solvent. The solution is dried and afterwards heated to a temperature between 100° C. and 150° C. to make the precursors react and form the hydrophilic and self-healing PU layer. The document does not concern tempered glass.

GB 839677 A discloses to coat glass and afterwards anneal or temper it.

The object of the present invention is to provide a method for producing a tempered vehicle glazing and a tempered vehicle glazing unit with improved security properties.

The method according to the present invention for producing a safety tempered vehicle glazing unit, comprises:

a. tempering a glass pane at a tempering temperature, b. cooling the tempered glass pane to a first temperature T1 above room temperature, c. coating the tempered glass pane with a dispersion of an organic resin at the first temperature T1 and d. drying and cooling to room temperature Tr.

The steps are preferably performed in the order a to d. The coating obtained by the above method provides anti-shattering properties.

Step a) comprises in particular a step of bending the glass pane to its final shape.

The tempering temperature is preferably above the first temperature. By coating the glass pane during the overall cooling process, an additional heating step, f.e. for the drying and/or formation of the layer, is not necessary and the energy consumption in the process is reduced.

In an embodiment the method comprises a step a1 before step b:

a1. Apply a further coating on the glass pane or tempered glass pane. Step a1 can be performed before or after step a, i.e. before or after tempering the glass pane.

In one alternative, the tempered glass pane is cooled down to room temperature and heated up to temperature T1 between step b and step c.

In a further embodiment the first temperature T1 is between 40° C. and 220° C., preferentially between 40° C. and 200° C., preferentially between 40° C. and 180° C., preferentially between 40° C. and 130° C., preferentially between 40° C. and 100° C., preferentially between 50° C. and 80° C. Due to the deposition at the elevated temperature T1, the coating can be deposited and directly eliminating any gas or air bubbles in order to obtain a bubble free coating. Bubbles or voids in the coating would reduce the anti-shattering properties and decrease the optical properties. However, the first temperature T1 is chosen such, that the dispersion is not too much flowing obtain a uniform coating even in case of a bent tempered glass.

The dispersion may be a polyurethane dispersion. In particular the dispersion comprises or consists of an anionic aqueous solution of a polyurethanic compound including at least one aliphatic or aromatic polyurethanic compound. The dispersion can be used for a long time, which reduces costs and waste for the production method. An aqueous solution is advantageous in view of environmental aspects over other solvents. In particular, the dispersion does not include a compound having particular hydrophilic properties, in particular the dispersion does not include polyvinylpyrrlidone. In particular, the dispersion is a non-reactive dispersion.

The further coating may comprise one or more of a IR-light reflective coating, a low emissivity coating or enamel coating. The IR-light reflective coating or low emissivity coating may in particular comprise a dielectric layer comprising dielectric oxides or nitrides. The IR-light reflective coating or low emissivity coating may further comprise at least one electrically conductive layer, e.g. a metal layer or a layer of a transparent conductive oxide (TCO). For example, coatings with one or several silver layers and additional dielectric layers are commonly used as IR-light reflective coatings. For example, coatings with a layer of indium tin oxide (ITO) and additional dielectric layers are commonly used as low emissivity coatings.

The coating method of step c may be a curtain coating step or spray coating step, preferentially a curtain coating step. This allows a homogeneous coating and thus improved anti-shattering properties and improved optics.

According to the present invention the safety tempered vehicle glazing unit comprises a tempered glass pane and a coating with an organic resin.

In an embodiment the coating is applied on the inner side of the glass pane. The inner side of the glass pane is the side directed to an inner space of the vehicle, when the vehicle glazing unit is installed. Vehicle glazing units typically are bent, and the inside typically is the concave surface of the glazing unit. On the inside, the coating is less exposed to environmental conditions, in particular mechanical wear, UV irradiation and therefore the durability of the coating is enhanced.

In a further embodiment the coating comprises polyurethane or consists of polyurethane. In particular the coating is obtained from a dispersion as disclosed above.

In a further embodiment the drying of step d comprises a heating to a temperature T2 before the cooling to room temperature Tr. Temperature T2 is above the temperature T1, it is preferably between 80° C. and 220°, preferentially between 80° C. and 200° C., preferentially between 80° C. and 180° C., preferentially between 80° C. and 130° C. This heating might be applied for thicker coating layers or for reducing the production time.

Preferably the coating, in particular if applied on the inner side is UV stable. The vehicle glazing unit has preferably the same transmission as a tempered glass pane without the coating with the organic resin. In particular the transmission of the vehicle glazing unit has a transmission of T-ref±5%, wherein T-ref is the transmission of a reference tempered glass pane without the coating with the organic resin. The term "transmission" refers to the light transmission in the visible spectrum, preferably according to ECE-R 43, appendix 3, § 9.1 (method for measuring light transmission of motor vehicle panes).

In an example of a side window with a PLC glass (PLC: Planiclear® provided by Saint-Gobain Glass, a clear float glass) as vehicle glazing unit, the coated glazing unit has a transmission of 72.4±0.6%, wherein a reference non-coated glazing unit has a transmission T-ref of 71.7±0.7%. Thus the transmission of the reference glazing unit and the coated glazing unit are equal within the measurement tolerance. After UV irradiation of 430 W/m² for 100 h at 45° C. the transmission of the coated glazing unit is 88.4% whereas it is 86.2% before the aging. The light transmissions (TL) are in the same range of values and the difference is the admissible. Moreover, this TL % difference is not visible to naked eye.

The thickness of the glass pane is preferably from 1 mm to 10 mm, particularly preferably from 2 mm to 10 mm. The thickness of the coating with the organic resin is preferably from 15 μm to 200 μm, particularly preferably from 90 μm to 150 μm. Within this range, particularly good results with respect to stability and security properties can be achieved.

The vehicle glazing unit may be one of a glass roof, a side window or back window.

Embodiments and aspects of the invention are illustrated in the drawing. In the drawing shows FIG. 1 a first embodiment of the safety tempered vehicle glazing unit, FIG. 2 a second embodiment of the safety tempered vehicle glazing unit and FIG. 3 an embodiment of the method for producing a safety tempered vehicle glazing unit.

FIG. 1 shows a first embodiment of the safety tempered vehicle glazing unit 1. The glazing unit 1 comprises a tempered glass pane 2 which is a bent glass pane in this example. The glass pane 2 has a first outer surface I and a second inner surface II. On the inner surface 4 is applied from an organic resin dispersion. The coating 4 provides anti-shattering properties to the safety tempered vehicle glazing unit. The coating is in particular a polyurethane coating.

Figure 2:
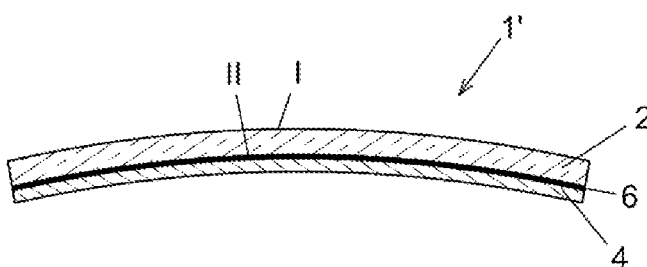

FIG. 2 shows a second embodiment of the safety tempered vehicle glazing unit 1'. The glazing unit 1' comprises a further coating 6 located in between the coating 4 having anti-shattering properties. The further coating 6 might be an IR-coating.

Figure 3:
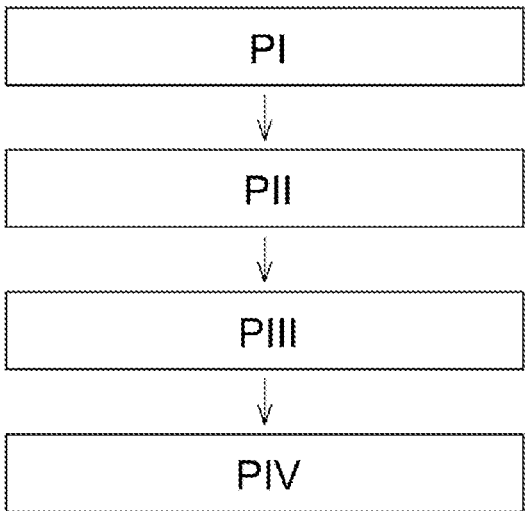

FIG. 3 shows a schema of the method for producing a safety tempered vehicle glazing unit.

In step PI a glass pane (2) is tempered and might be bent into the form of the vehicle glazing unit. Step P1 might further include the application of a further coating, for example an IR reflective coating.

In step PII the tempered glass pane (2) is cooled to a first temperature T1. This first temperature T1 is preferentially a temperature between 50° C. and 80° C.

In step PIII the tempered glass pane (2) is coated with a dispersion of an organic resin at the first temperature T1. At this first temperature T1, the dispersion forms a bubble free coating layer ensuring good anti-shattering properties.

In step PIV the tempered glass pane (2) with the coating is dried and cooled down to room temperature Tr. Optionally step PIV includes heating the tempered glass pane (2) for drying the coating at a temperature T2 and subsequently cooling to room temperature Tr. In this step PIV the dispersion of an organic resin dries and forms a layer with the anti-shattering properties.

REFERENCE NUMBERS 1, 1' glazing unit
2 tempered glass pane
4 coating
6 further coating
I outer side of the glass pane
II inner side of the glass pane

The invention claimed is:

1. A method for producing a safety tempered vehicle glazing unit formed of a single pane, comprising:
    a. tempering a single glass pane at a tempering temperature, including bending the pane to have a concave inner surface;
    b. cooling the tempered glass pane to a first temperature T1 above room temperature Tr;
    c. coating over the concave inner surface of the tempered glass pane with a dispersion of an organic resin at the first temperature T1, and
    d. drying and cooling to room temperature Tr, thus drying the dispersion to form a layer with anti-shatter properties,
    wherein the glazing unit with said layer has a light transmission in the visible spectrum of T-ref±5%, where T-ref is a light transmission in the visible spectrum of a reference glazing unit, which is the same glazing unit without said layer,
    wherein said layer has a thickness of 90 μm-200 μm.

2. The method according to claim 1, comprising a step a1 before step b:

a1. applying a further coating on the glass pane or tempered glass pane, the coating being on the concave inner surface.

3. The method according to claim 2, wherein the further coating comprises one or more of an IR-light reflective coating or enamel coating.

4. The method according to claim 2, wherein the further coating comprises an IR-light reflective coating,
    wherein the dispersion is a polyurethane dispersion, and
    wherein the light transmission of the glazing unit with said layer and the light transmission of the reference glazing unit are equal within a measurement tolerance.

5. The method according to claim 1, wherein the first temperature T1 is between 40° C. and 220° C.

6. The method according to claim 5, wherein the first temperature T1 is between 40° C. and 100° C.

7. The method according to claim 6, wherein the first temperature T1 is between 50° C. and 80° C.

8. The method according to claim 1, wherein the dispersion is a polyurethane dispersion.

9. The method according to claim 1, wherein said dispersion consists of an anionic aqueous solution of a polyurethanic compound including at least one aliphatic or aromatic polyurethanic compound.

10. The method according to claim 1, wherein the coating of step c is a curtain coating step or spray coating step.

11. The method according to claim 10, wherein the coating of step c is a curtain coating step.

12. The method according to claim 1, wherein the drying of step d comprises a heating to a temperature T2, the temperature T2 being higher than the first temperature T1, before the cooling to room temperature Tr.

13. The method according to claim 1, wherein said layer has a thickness of 90 μm-150 μm.

14. The method according to claim 1, wherein the light transmission of the glazing unit with said layer and the light transmission of the reference glazing unit are equal within a measurement tolerance.

* * * * *